United States Patent [19]

Tschudi et al.

[11] 4,174,179
[45] Nov. 13, 1979

[54] CONTINUOUS FEED HOLOGRAPHIC CORRELATOR FOR RANDOMLY ORIENTED WORKPIECES

[76] Inventors: Theodor Tschudi, Reinmattstrasse 1; Guy Indebetouw, Madergutstrasse 31, both of Bern, Switzerland

[21] Appl. No.: 827,351

[22] Filed: Aug. 24, 1977

[51] Int. Cl.² .......................... G06K 9/08; G03H 1/28; G02B 27/38
[52] U.S. Cl. .................... 356/71; 350/3.77; 350/162 SF
[58] Field of Search ............... 350/162 SF, 3.75, 3.77; 356/71

[56] References Cited

U.S. PATENT DOCUMENTS

| | | | |
|---|---|---|---|
| 3,670,305 | 6/1972 | Maloney | 356/71 |
| 3,751,132 | 8/1973 | Groh | 350/162 SF |
| 3,773,401 | 11/1973 | Douklias et al. | 350/162 SF |
| 3,794,406 | 2/1974 | Kock et al. | 350/162 SF |
| 3,802,762 | 4/1974 | Kiemle | 356/71 |

*Primary Examiner*—Ronald J. Stern
*Attorney, Agent, or Firm*—Sherman & Shalloway

[57] ABSTRACT

A method and apparatus to optically control mass produced articles by a holographic correlator. The articles are continuously moved through an input beam of the holographic correlator. The correlator employs a holographic filter having a plurality of Fourier spectra recorded thereon, which are spatially separated but overlapping and which correspond to different orientations of the reference specimen. During the translation of the object through the input beam, the beam is reflected so that all spectra are addressed through the holographic filter. The output correlation spot is detected through a diaphragm having a slit-form aperture. This apparatus and the method it employs does not depend on the orientation between the article and the holographic filter, thereby providing accurate results at high speeds.

13 Claims, 6 Drawing Figures

CONTINUOUS FEED HOLOGRAPHIC CORRELATOR FOR RANDOMLY ORIENTED WORKPIECES

BACKGROUND OF THE INVENTION

The invention relates to a method of automatically checking the form of workpieces produced in large numbers, and to an apparatus for carrying out the method. Its object is more particularly to compare workpieces in respect of their form with a specimen, the said workpieces being continuously fed at a high rate. The comparison permits a simple decision as to whether the workpieces are acceptable or unacceptable, i.e., as to whether their shape does or does not conform well with that of the specimen.

Usually, this is done by gauging the critical dimensions or by visually comparing the individual workpieces with a specimen. The visual comparison takes place without special aids or by means of a measuring microscope, a projection apparatus or like optical enlarging means, depending upon the size of the workpiece and the required tolerances. In the case of workpieces of complicated shape, the application of such visual checking methods is very time-consuming and labour-intensive.

Checking methods in which holography is employed have been developed and are being used for special applications. These holographic methods are carried out with devices which were originally developed for character recognition in accordance with the proposal of A. Vander Lugt in the year 1964 (IEEE Trans. Inf. Theory IT-10,139).

This method is based upon the following principles: an object is illuminated by a beam of coherent light. The object beam scattered by the object contains all the information regarding the shape of the object. A reference beam emanating, for example, from a point source is superimposed upon the object beam. The object beam and the reference beam, or the interference pattern formed, is fixed on a photographic plate, i.e., the hologram, which thus contains all the information regarding the object. If the hologram is again illuminated only by the object beam, i.e., the light beam scattered by the object, there is set up beyond the hologram a light beam which is identical with the reference beam used for the recording, that is to say, the reference beam is reconstructed. If the latter has originated from a point source, there is then again obtained a reconstructed point source. If, instead of the object, an article to be tested identical with the object is introduced into the beam emanating from the light source, a point source is again reconstructed. Should the article to be tested differ from the object in its geometry, a reconstructed point source is not obtained, but a more or less large spot. The size of this spot, or the reduction of the intensity at the centre, is hence a measure of the geometrical difference between the tested article and the object.

The further development of this testing method is based upon the principles of Fourier optics. It is known that if a first lens is disposed, at a distance equal to its focal length, behind an object illuminated by a plane light beam, there is obtained in the rear focal plane a distribution of the light amplitude which corresponds to the spatial two-dimensional Fourier transform of the object. If a complex filter is then disposed in the said plane and a second lens forms on a plane an image of the beam issuing from the said filter, there is here obtained the Fourier transform of the filtered Fourier transform of the object. This transform thus corresponds to the filtered image of the object, because two successive Fourier transformations give the original function with the exception of the sign of the argument and any existing scale factor.

It will now be assumed that the complex filter is produced as follows. The object is again illuminated by a plane coherent light beam. The first lens is situated beyond the object. In its rear focal plane, where the image of the Fourier transform of the object is formed, there is superimposed upon the said transform an obliquely incident plane reference beam coherent with the light beam. The interference pattern produced is recorded on a photographic plate. The developed photographic plate is called the holographic filter of the object.

If the object is replaced by an article to be tested, which is illuminated with the plane light beam, whose Fourier transform is reproduced by the first lens in its rear focal plane by the first lens, the holographic filter of the object is introduced into the said plane and the beam issuing therefrom is transformed by the second lens, there is obtained in the rear focal plane of the latter, on the one hand, the cross-correlation integral of the test piece function with the conjugate-complex object function, and on the other hand at another location on the rear focal plane the convolution integral of the test piece function with the object function. Only the first is of particular interest to use here. If the test piece function is contained in the object function, or if the two are identical, the cross-correlation integral becomes integral with an auto-correlation integral, which is generally distinguished by a sharp, central, intensive light spot.

It is thus possible to ascertain with a light-sensitive element whether a tested article is or is not identical with the object.

Detailed illustrations of the principles and examples of application of this technique are to be found, for example, in the book "Optical and Acoustical Holography," issued by Ezio Camatini, Plenum Press, New York-London, 1972.

A whole number of difficulties arise in the practical application of this method.

The dynamic range of the photographic plate does not permit of faithfully recording the interference pattern of the whole spectrum. In practice, therefore, the best possible compromise must be brought by experiments. It is often even advantageous for the very high space frequencies not to be recorded, because they only contain information regarding the surface nature of the object. Often, the interference pattern of the spectrum is also calculated if the geometry of the object can be simply mathematically described. The holographic filter is then synthesised.

A further difficulty resides in the sensitivity of the installation to errors in the scale and the angular position of the tested article. The first error, which must generally be recognized for monitoring and comparison purposes, can be balanced out by variable focal widths of the lenses in special cases where it is to be disregarded. The second error, which has nothing to do with the shape of the tested article, but is generally due to the difficulty in handling and accurately positioning it, is offset by rotating either the tested article or the holographic filter about the optical axis. However, this is not readily practicable because the rotation must take place in a plane and without vibration. In addition, it requires a time which is often not available in the monitoring of articles produced in large numbers. One object of this invention is to indicate a means by which this difficulty can be readily avoided and which renders possible measurements in rapid succession.

A further family of difficulties resides in the inaccuracy in the positioning of the various elements of the apparatus.

Above all, the position of the holographic filter is essential for obtaining a sufficiently informative signal. The requirements, i.e., the positioning tolerances, are in the order of magnitude of the wavelength of the light employed. It is thus clear that a constant rotation of the filter can be effected only at very great cost.

The position of the article to be tested in the direction of the optical axis is not very critical because, as is known, the installation is rendered translationally constant by the use of the transformation lenses. However, the deviation from the ideal position should be much less than $2l^2/\lambda$, where l is a small characteristic length of the article which is to be monitored, and $\lambda$ the light wavelength. Normally, tolerances of a few tenths of a millimeter or more are obtained.

Displacement of the tested article perpendicularly to the optical axis results in a displacement of the location of the correlation function on the plane of emergence of the image. The height of the function at the centre is not influenced thereby. Since this height is the magnitude of interest to us, which renders possible information regarding differences in shape of the tested article with respect to the object, it is consequently obvious to fix the location of the correlation spot (abbreviation for the centre of the correlation function) and then to measure the height thereof. This is done, but involves very costly electronic equipment. In addition, there do not at present exist any light-sensitive surfaces which give a like evaluation of a like signal over the whole area. Consequently measuring errors arise, depending upon the location of the correlation spot. In order to eliminate this possibility of error, there is therefore employed a light-sensitive element of very small extent, or a diaphragm having a very small aperture is disposed in front of the element. Since the correlation function can very rapidly decrease, starting from the centre, and as mentioned only the absolute height at the centre is of interest, the correlation spot must be very accurately adjusted to the quasi-point form, light-sensitive element (detector) (or vice-versa). A diaphragm aperture of, for example, 0.01 mm or a light-sensitive element of corresponding size involves a positioning tolerance of the correlation spot of the order of magnitude of 1 $\mu$m. With a 1:1 image formation, therefore, the tested article must be positioned with this tolerance, with the detector fixed in position, which is not practicable with mass-produced articles which have to be tested at a high rate.

A further difficulty resides in that certain workpieces can only be pre-sorted the right way round at high cost. Stamped sheet-metal plates of round form having irregularly distributed apertures are one example. It is desirable to be able to carry out a monitoring with such plates in any desired angular position and without any particular plate face (upper or lower) always having to be in the same position.

It is consequently an object of the present invention to indicate a method and an apparatus for the application thereof, by which the requirements as to the accuracy of the positioning of the article to be tested and as to its orientation can be met in a practical manner and which permit comparison in rapid sequence.

SUMMARY OF THE INVENTION

In accordance with the invention, this object is achieved with a holographic correlator by the following steps:

1. the specimen is illuminated by a first coherent light beam;
2. the scattered light beam is transformed by a lens to produce the Fourier transform of the specimen;
3. there is superimposed upon the said Fourier transform a second, obliquely incident coherent light beam, and the interference pattern is recorded on a photographic plate;
4. the orientation of the pattern is changed;
5. the axis of the first light beam is tilted;
6. steps 2 and 3 are repeated;
7. steps 4, 5 and 6 are repeated a number of times;
8. the photographic plate is developed;
9. the pattern and the second light beam are removed;
10. workpieces are individually passed through the first light beam;
11. the axis of the first light beam is constantly changed, so that it occupies, during the passage of each individual workpiece according to step 10, all positions which it occupies in the repeated performance of step 4;
12. the developed photographic plate is introduced into the path of the light beam scattered by the workpiece and transformed by the first lens, and the issuing beam passes through a second transformation lens;
13. the intensity of the beam issuing from the second transformation lens is measured at a fixed location through a slit diaphragm;
14. the maximum value of the measured intensity of each workpiece is compared with a threshold value; and
15. the workpiece is sorted in dependence upon the comparison according to step 14 for different further uses.

The installation according to the invention by means of which the aforesaid object can be achieved is characterized in that the workpieces to be monitored are continuously passed through the beam directed from the light source on to a holographic image, in that a first lens transforms the beam diffracted by the respective workpiece to be monitored; in that the said first transformation lens is so disposed between the workpiece and the holographic image that the latter are spaced apart by the respective focal length; in that there is provided between the light source and the holographic image a deflecting device which deflects the light beam with a conical-rotating motion through a small, preset angle; in that the holographic image consists of a superimposition of a number of individual images, each of which contains the characteristic properties of the same pattern in a different orientation; in that a second transformation lens is disposed in the path of the rays beyond the holographic image; in that a light-sensitive sensor is provided in the focal plane of the second transformation lens; in that the light-sensitive surface of the sensor is of slit form, and in that the light-sensitive sensor supplies an output signal which is representative of the intensity of the light falling upon the light-sensitive surface.

BRIEF DESCRIPTION OF THE DRAWINGS

A form of construction of the apparatus according to the invention is illustrated in the figures, in which.

DESCRIPTION OF THE PREFERRED EMBODIMENT

Figure 1:
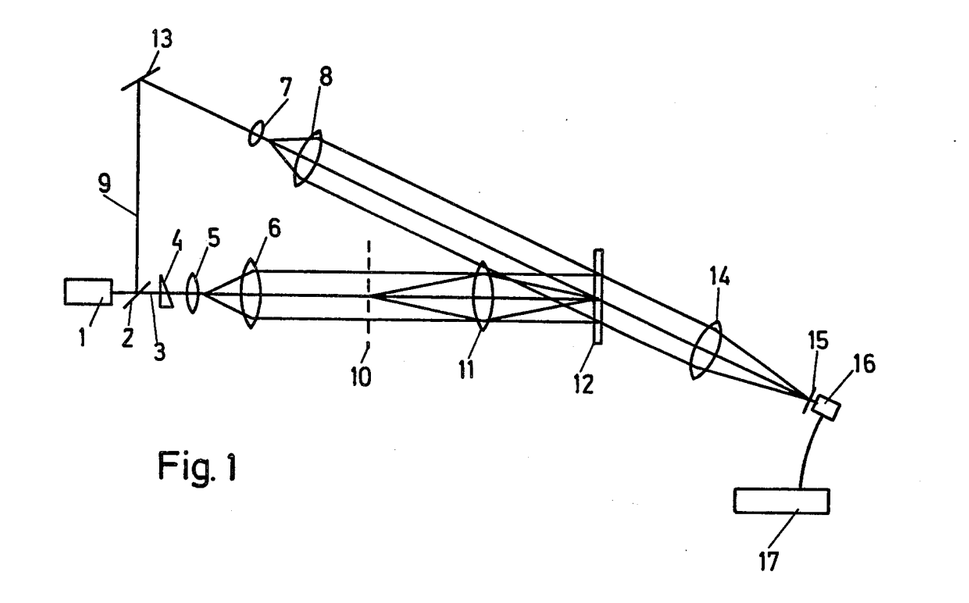
FIG. 1 is a diagram of an apparatus for carrying out the method.

The apparatus according to FIG. 1 consists of a light source, for example a laser 1, which produces a sharply concentrated coherent light beam. The said light beam is split into two beams by a semi-transparent mirror 2. One beam 3 falls upon a deflecting element 4, whereby it is deflected through a small angle. The succeeding lenses 5 and 6 act as a beam-widening element for bringing the effective cross-section of the beam to the desired size. This may, of course, be alternatively directly effected in the light source. In the illustrated example, an additional beam-widening element 7 and 8 is required for widening the second beam 9, i.e., the reference beam. The principal beam leaves the lens 6 as a parallel beam and impinges as such on the plane 10, which is called the object plane. In the recording of the hologram, the specimen object is situated in the said object plane, and in the monitoring of workpieces, the latter are here brought into the beam. The beam diffracted by the object is so transformed by the lens 11 that the Fourier transform of the object is produced in the hologram plane 12. In relation to the lens 11, the object plane 10 lies in the rear focal plane of the lens 11. The reference beam 9 is so deflected by a mirror 13 that it falls obliquely upon the hologram plane 12. In the recording of the holographic filter, there is introduced into the plane 12 a photographic plate which stores the interference pattern of the Fourier transform of the specimen object with the reference beam.

When a workpiece is to be compared with the specimen, the workpiece is introduced into the beam in the plane 10 in place of the specimen. The reference beam is then no longer required. It may be deflected, for example, by tilting of the mirror 13. The developed, exposed photographic plate, i.e., the holographic filter, is erected in the plane 12, it having to be ensured that its position coincides very accurately with the position of the photographic plate during the exposure.

Situated beyond the holographic filter is the second transformation lens 14, which lies in the prolongation of the optical axis of the reference beam. As described in the beginning, the cross-correlation function between the workpiece being tested and the specimen is reflected in the focal plane of this lens, where the diaphragm 15 and the detector 16 are situated. The signal generated by the detector 16 and corresponding to the intensity of the light falling upon it is applied to a discriminator circuit 17.

Figure 2:
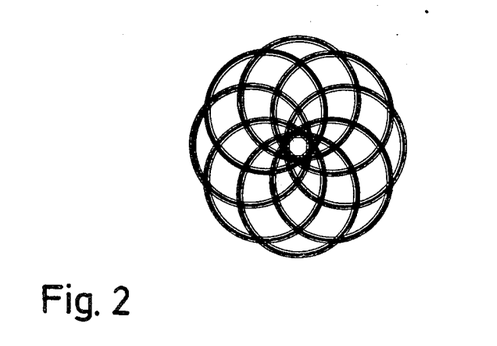
FIG. 2 is a multi-hologram drawn in very diagrammatic form.

In the following, the manner of operation of the elements 4 and 15 will be more particularly described. Since it often happens that the angular position of the articles being tested is critical for the recognition but the said articles cannot readily be brought into the beam in the correct, i.e., always in the same, angular position in the object plane, the specimen object is brought into the beam during the recording, i.e., the exposure of the photographic plate, in an arbitrarily chosen first angular position. The beam 3 is then deflected through a small angle by the deflecting element 4. In this way, the Fourier transform of the specimen object is shifted on the photographic plate, that is to say, it is eccentrically recorded. Thereafter, the specimen object is turned about the optical axis through a part of a whole revolution. At the same time, the deflecting element is also turned about the optical axis. The Fourier transform of the specimen object which is thereby recorded on the photographic plate is in turn eccentric, but in another direction. These steps are repeated, preferably more than four (4) times and less than 24 times, until the specimen object is again in the original position. Thereafter, the photographic plate is developed and thus brought into the form of a multiple hologram. FIG. 2 illustrates such a multiple hologram in greatly simplified form, the Fourier transforms of eight different angular positions of the specimen object being stored one over the other.

It is of course also possible to produce such a multiple hologram by calculating the interference patterns and synthetically producing a multiple hologram therefrom in known manner.

In the case of some workpieces, difficulties are also often encountered in so feeding them that the same side is always exposed to the beam. The multiple hologram according to the invention may therefore be produced by storing one upon the other the interference patterns of different positions, e.g., from the front and from the rear. This makes it unnecessary for the articles being tested to be pre-sorted the correct way round.

The diaphragm 15, which is usually a circular-apertured diaphragm, as already described, is in this case in the form of a split diaphragm. The width of the slit may be, for example, 10 μm and its length 200 μm.

Figure 3:
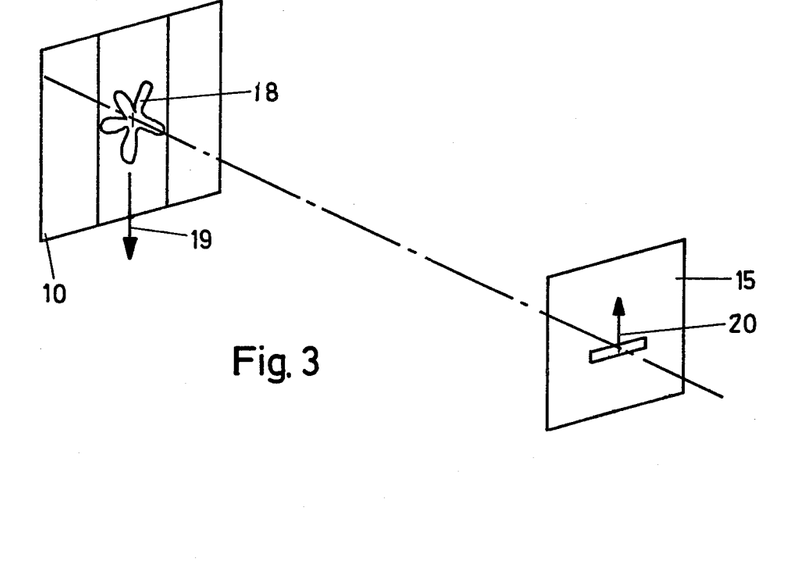
FIG. 3 is a diagrammatic sketch of the movement of a test piece and of the resultant displacement of the correlation spot on the diaphragm.
Figure 4:
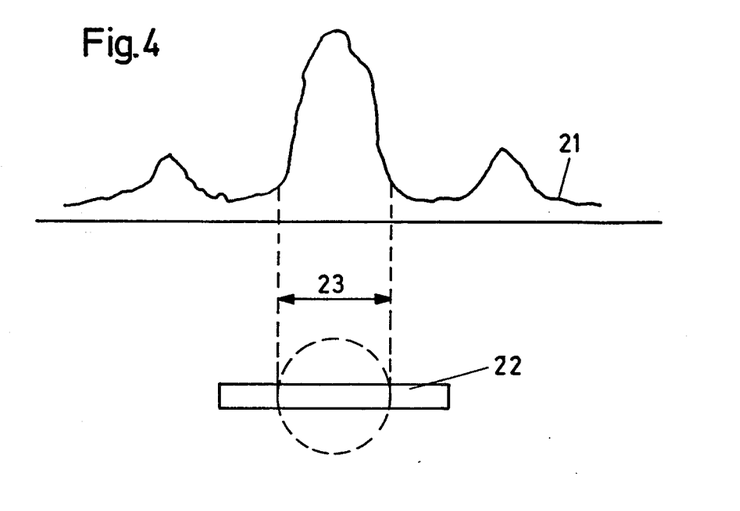
FIG. 4 shows a comparison of the size of the correlation signal with the aperture of the slit diaphragm.

For the comparison monitoring, an article to be tested is drawn through the beam in the plane 10. As illustrated in simplified form in FIG. 3, the article 18 being tested is laterally guided, but moved in an arbitrary angular position in the direction 19. The corresponding correlation spot then travels over the slit diaphragm 15 in the direction of the arrow 20. The approximate dimensional ratios are illustrated in FIG. 4. The curve forms of the correlation function for a tested article corresponding approximately to the specimen article is denoted by 21. The diameter of the correlation spot 23 is much smaller than the length of the slit 22 in the diaphragm 15. The width of the slit, however, is smaller than the diameter 33. In this way, a certain insensitivity of the lateral guiding of the tested article is achieved. The correlation spot thus travels over the slit diaphragm, and the detector 16 situated beyond it supplies a signal corresponding to the curve form of the intensity of the light which can pass through the slit. In addition to this sensing of the correlation spot in one direction, there is effected a further sensing which is generated by the deflecting element 4. The latter rotates at very high speed, so that the axis of the light beam which transilluminates the article being tested, i.e., the centre of the Fourier transform, moves in the plane 12 along a circle. At each complete revolution, therefore, all the individual holograms of the multiple filter are sensed. The intensity of the correlation spot will be greatest with the angular position in which the specmen object lies in an angular orientation for recording the hologram which corresponds approximately to the orientation of the article being tested. The speed of rotation of the deflecting element 4 is made such, in relation to the velocity of translation of the tested article 18 in the direction 19, that a complete revolution takes place in a time which is shorter than the time taken by the correlation spots to pass over the slit 22. In this way, the maximum intensity of the correlation spot, and hence the magnitude of the signal supplied by the detector, is additionally modulated.

Figure 5:
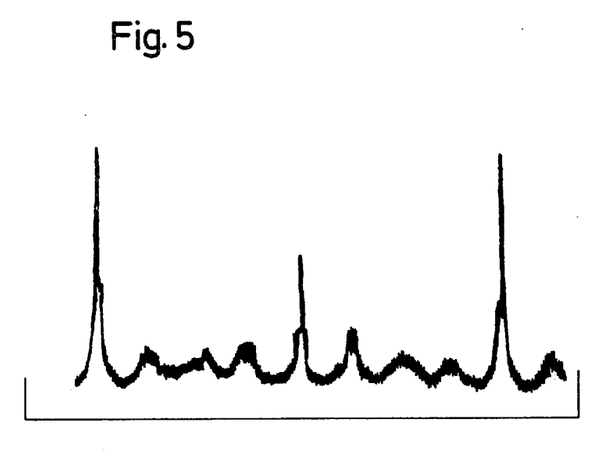
FIG. 5 shows a recording of the signal curve form when a multi-hologram is employed.

FIG. 5 illustrates an example of the curve form of the signal supplied by the detector. The eight correlation spots of the eight individual holograms which are successively sensed are clearly visible. The first and eighth peaks, which are identical because they have been produced by the same individual hologram, are the highest; this is therefore the individual hologram which was recorded when the specimen object was situated in approximately the same angular position as the article being tested here. The significant information in this case, however, does not relate to this angular position, but to the identity of the tested article with the specimen object, or its deviation therefrom. The height of the highest peak of the signal of the detector during the passage of an article being tested through the beam is a measure of the deviation of the form of the tested article from the specimen object.

In practice, it is found by means of examples by how much this signal may differ from that of an ideal specimen and the tested object can still be classified as "good." This limit must, of course, be smaller, i.e., be at lower intensities, than it would be due to any deviations of the angular position of the test piece from the discrete angular positions of the specimen object during the recording of the hologram. Otherwise, it is necessary to expose the specimen object in a larger number of angular positions, that is to say, to increase the number of individual holograms of the multiple hologram.

It will be seen from FIG. 5 that the fifth peak is higher than those on either side of it. This is due to an almost symmetrical form of the tested object.

Figure 6:
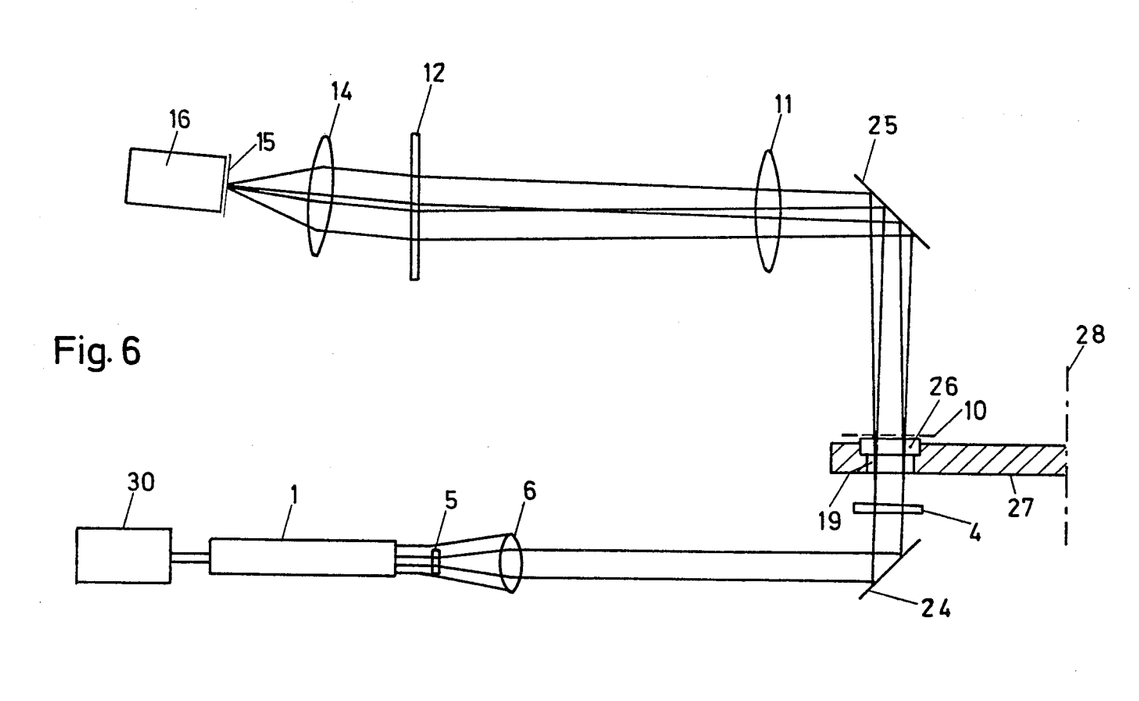
FIG. 6 diagrammatically illustrates the construction of an apparatus for monitoring articles manufactured on a large scale.

FIG. 6 diagrammatically illustrates the construction of a monitoring apparatus. The elements described with reference to FIG. 1, which here perform the same functions, are denoted by the same reference numerals. As is apparent, the beam is twice deflected by the two mirrors 24 and 25. This makes it possible on the other hand to shorten the overall length of the installation and on the other hand to cause the beam to pass vertically from the bottom upwards through the object plane. In this way, the manipulation and the feeding of the tested articles are greatly simplified. This can be done as indicated in FIG. 6, for example, by means of a device similar to a rotary platen. The articles to be tested are passed through the beam on a platen 27 which is rotatable about the vertical axis 28 and which has a number of apertures 29 in which there are disposed glass plates 26 serving as object supports. The articles to be tested are laid upon the object support 26 by means of a feed device (not shown) of a known type frequently employed in industry. The platen 27 rotates at a constant speed. In this way, the articles being tested are passed through the beam and, after leaving it, are removed from the object support by a stripping device (not shown). The sorting into two bins in accordance with whether the result of the test is "good" and "bad" can here take place in known manner The object supports are then freed from any dust or other impurities by means of a cleaning device, and return into the region of the feed device, which loads the object carrier with a fresh article to be tested.

FIG. 6 illustrates as a further feature an additional light detector 30 which measures the light produced by the light source 1. It may happen that the intensity of the light beam varies with time, and this variation brings about a variation of the intensity of the correlation spot, which could be interrupted as a change in the shape of the article being tested. This is compensated for by the use of the detector 30, the output signal of which is used as a reference signal for the signal of the detector 16. Such compensating methods are known elsewhere in the art and are widely used.

A further possible method of testing the calibration of the installation consists in measuring periodically a known good specimen article for the monitoring, measuring the output signal obtained and, if it differs from the signal previously obtained with the specimen article, adapting the decision threshold of the discriminator.

The construction of the discriminator 17 need not be particularly described here, because such instruments are widely used. We claim:

1. A method comparing an object with a reference specimen by means of a coherent optical multichannel correlator employing a coherent input light beam and an output beam passing through a filter, said method comprising the steps of:
    (a) producing a holographic filter containing a spatially distinct plurality of images each representing characteristic properties of the referenece specimen in different specimen orientations;
    (b) using said holographic filter as the filter in the correlator;
    (c) translationally moving the object to be compared through the coherent input light beam of the correlator;
    (d) detecting and measuring the intensity of the output beam of the correlator through a slit diaphragm; and
    (e) sorting the object in dependence upon the maximum value of the intensity measured during said translational movement of the object to be compared.

2. The method of claim 1 wherein the plurality of images such represents characteristic properties of the reference specimen in rotationally different specimen orientations about an axis parallel to the optical axis of the correlator.

3. The method of claim 1 wherein the step of producing the holographic filter further comprises the steps of:
    (a) analytically computing an interference pattern of a coherent light beam with the Fourier spectra of the reference specimen in different specimen orientations; and
    (b) manufacturing a transparency according to said interference pattern.

4. An apparatus for comparing objects with a reference specimen comprising:
    (a) a coherent optical multichannel correlator including a holographic filter containing a spatially distinct plurality of images each representing characteristic properties of the reference specimen in different specimen orientations;

(b) a coherent light source supplying said correlator with a coherent input light beam which is directed to the object to be compared and results in a diffracted beam;

(c) a first lens transforming the diffracted beam and directing the diffracted beam toward the holographic filter of said correlator.

(d) a deflecting means which deflects with a conical-rotating movement the coherent input light beam of said coherent light source through a small, preset angle;

(e) means for translatioally moving the object to be compared through said deflected light beam;

(f) a second transformation lens disposed in the path of the diffracted light beam after the diffracted light beam has passed through the holographic filter;

(g) a light-sensitive sensor having a light-sensitive surface of slit form disposed on a focal plane of said second transformation lens; and (h) said sensor supplying an output signal corresponding to a light intensity impinging upon the sensitive surface of said light-sensitive sensor whereby the output signal corresponds to the comparison between the object to be compared and the reference specimen.

5. An apparatus according to claim 4 wherein said means for translationally moving said object comprises an object support which is transparent to the light beam and which is situated on a platen rotating about an axis parallel to an axis of a deflection cone formed by the conical-rotating movement of said light beam.

6. An apparatus according to claim 4 wherein said holographic filter is a successively exposed photographic filter.

7. An apparatus according to claim 4 wherein said holographic filter is synthesized.

8. An apparatus according to claim 4 wherein said light-sensitive sensor consists of a light-sensitive element and a preceding diaphragm having a slit-form aperture.

9. An apparatus according to claim 4 wherein the width of said slit-form is less than 0.1 mm.

10. An apparatus according to claim 4 wherein the ratio of length to width of said slit-form is of the order of magnitude of 20:1.

11. An apparatus according to claim 4 wherein the number of said plurality of images is greater than 4 and less than 24.

12. An apparatus according to claim 8 wherein the width of said slit-form is less than 0.1 mm.

13. An apparatus according to claim 8 wherein the ratio of length to width of said slit-form is of the order of magnitude of 20:1.

* * * * *

UNITED STATES PATENT AND TRADEMARK OFFICE
CERTIFICATE OF CORRECTION

PATENT NO. : 4,174,179
DATED : November 13, 1979
INVENTOR(S) : TSCHUDI, ET AL.

It is certified that error appears in the above-identified patent and that said Letters Patent are hereby corrected as shown below:

In claim 2, column 8, line 52, delete "such" and insert -- each --

Signed and Sealed this

Twelfth Day of February 1980

[SEAL]

Attest:

SIDNEY A. DIAMOND

Attesting Officer

Commissioner of Patents and Trademarks